United States Patent
Ramachandran et al.

(10) Patent No.: US 9,451,641 B2
(45) Date of Patent: Sep. 20, 2016

(54) METHODS AND APPARATUS FOR IMPROVING DATA SERVICE AVAILABILITY

(71) Applicant: QUALCOMM Incorporated, San Diego, CA (US)

(72) Inventors: Shyamal Ramachandran, San Diego, CA (US); Thomas Klingenbrunn, San Diego, CA (US); Zhong Ren, San Diego, CA (US); Vitaly Drapkin, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 96 days.

(21) Appl. No.: 13/786,849

(22) Filed: Mar. 6, 2013

(65) Prior Publication Data

US 2013/0258998 A1 Oct. 3, 2013

Related U.S. Application Data

(60) Provisional application No. 61/618,561, filed on Mar. 30, 2012.

(51) Int. Cl.
*H04W 76/02* (2009.01)
*H04W 76/06* (2009.01)

(52) U.S. Cl.
CPC .......... *H04W 76/02* (2013.01); *H04W 76/027* (2013.01); *H04W 76/028* (2013.01); *H04W 76/062* (2013.01); *H04W 76/026* (2013.01)

(58) Field of Classification Search
CPC ... H04W 80/04; H04W 36/18; H04W 36/30; H04W 36/12; H04W 84/12

USPC ......... 370/331, 338; 455/436–439, 442, 445, 455/450, 550.1
See application file for complete search history.

(56) References Cited

U.S. PATENT DOCUMENTS

| 8,155,650 | B2* | 4/2012 | Iyer et al. ............... 455/436 |
| 2010/0081444 | A1* | 4/2010 | Jin et al. ............... 455/450 |
| 2011/0205967 | A1* | 8/2011 | Ping ............... 370/328 |
| 2011/0213897 | A1 | 9/2011 | Zhao et al. |
| 2012/0076121 | A1 | 3/2012 | Choi et al. |

(Continued)

FOREIGN PATENT DOCUMENTS

| CN | 101902732 A | 12/2010 |
| EP | 2364055 A1 | 9/2011 |

OTHER PUBLICATIONS

3$^{rd}$ Generation Partnership Project; Non-Access-Stratum (NAS) protocol for Evolved Packet System (EPS), Mar. 16, 2012, Stage 3 Release 11, p. 175.*

(Continued)

*Primary Examiner* — Gary Mui
*Assistant Examiner* — Stephen Steiner
(74) *Attorney, Agent, or Firm* — Patterson & Sheridan, L.L.P.

(57) ABSTRACT

Certain aspects of the present disclosure relate to methods and apparatus for improving data service availability. Certain aspects provide methods and apparatus for wireless communications by a UE including determining, while the UE is in a coverage area of a first network, that a connection to a second network, comprising a packet data network (PDN), is disconnected locally, and taking at least one action to avoid a rejection of a request to connect to the second network.

10 Claims, 9 Drawing Sheets

(56) References Cited

U.S. PATENT DOCUMENTS

| | | | |
|---|---|---|---|
| 2012/0115492 | A1 | 5/2012 | Liao |
| 2012/0182912 | A1 | 7/2012 | Watfa et al. |
| 2012/0208486 | A1* | 8/2012 | Liao .......................... 455/404.1 |
| 2012/0218889 | A1* | 8/2012 | Watfa et al. .................. 370/230 |
| 2012/0275401 | A1 | 11/2012 | Sun |
| 2013/0322274 | A1* | 12/2013 | Zakrzewski ................. 370/252 |

OTHER PUBLICATIONS

3$^{rd}$ GenerationPaternership Project TSG CT WG1, Meeting #64, May 2010, C1-101729, p. 1, 2.*

LG Electronics: "Clarification about APN based congestion control procedure", 3GPP Draft; C1-111880—Clarification About APN Based Congestion Control Procedure—24.008 V2.0, 3rd Generation Partnership Project (3GPP), Mobile Competence Centre; 650, Route Des Lucioles; F-06921 Sophia Antipolis Cedex; France, vol. CT WG1, No. Tallinn; May 9, 2011, May 2, 2011, XP050481219, [retrieved on May 2, 2011] the whole document.

Partial International Search Report—PCT/US2013/029514—ISA/EPO—Jul. 3, 2013.

ZTE: "Discussion on bearer synchronization between UE and the network", 3GPP Draft; C1-101729, 3rd Generation Partnership Project (3GPP), Mobile Competence Centre; 650. Route Des Lucioles; F-06921 Sophia-Antipolis Cedex; France, vol. CT WG, No. Kyoto; May 10, 2010, May 17, 2010, XP050409613, [retrieved on May 17, 2010] the whole document.

3GPP TS 36.101 V11.0.0, 3rd Generation Partnership Project; Technical Specification Group Radio Access Network; Evolved Universal Terrestrial Radio Access (E-UTRA); User Equipment (UE) radio transmission and reception (Release 11), Mar. 2012.

3rd Generation Partnership Project; Technical Specification Group Core Network and Terminals; Non-Access-Stratum (NAS) protocol for Evolved Packet System (EPS); Stage 3 (Release 11). 3GPP Standard; 3GPP TS 24.301, 3rd Generation Partnership Project (3GPP). Mobile Competence Centre ; 650, Route Des Lucioles ; F-06921 Sophia-Antipolis Cedex ; France, vol. CT WG1, No. V11.2.1, Mar. 16, 2012, pp. 1-327, XP050580267, [retrieved on Mar. 16, 2012] paragraph [6.5.1]-paragraph [6.5.3].

International Search Report and Written Opinion—PCT/US2013/029514, International Search Authority—European Patent Office, Dec. 2, 2013.

"3rd Generation Partnership Project; Technical Specification Group Services and System Aspects; General Packet Radio Service (GPRS) enhancements for Evolved Universal Terrestrial Radio Access Network (E-UTRAN) access (Release 11)", 3GPP Standard; 3GPP TS 23.401, 3rd Generation Partnership Project (3GPP), Mobile Competence Centre; 650, Route Des Lucioles; F-06921 Sophia-Antipolis Cedex; France, vol. SA WG2, No. V11.1.0, Mar. 8, 2012 (Mar. 8, 2012), pp. 1-284, XP050555356, [retrieved on Mar. 8, 2012].

* cited by examiner

METHODS AND APPARATUS FOR IMPROVING DATA SERVICE AVAILABILITY

CLAIM OF PRIORITY UNDER 35 U.S.C. §119

The present application for patent claims priority to U.S. Provisional Application No. 61/618,561, entitled "METHODS AND APPARATUS FOR IMPROVING DATA SERVICE AVAILABILITY," filed Mar. 30, 2012, and assigned to the assignee hereof and hereby expressly incorporated by reference herein.

BACKGROUND

1. Field

The present disclosure relates generally to communication systems, and more particularly, to method and apparatus for improving data service availability.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Certain aspects of the present disclosure provide a method for wireless communications by a user equipment (UE). The method generally includes determining, while the UE is in a coverage area of a first network, that a connection to a second network, comprising a packet data network (PDN), is disconnected locally, and taking at least one action to avoid a rejection of a request to connect to the second network.

Certain aspects of the present disclosure provide an apparatus for wireless communications by a user equipment (UE). The apparatus generally includes means for determining, while the UE is in a coverage area of a first network, that a connection to a second network, comprising a packet data network (PDN), is disconnected locally, and means for taking at least one action to avoid a rejection of a request to connect to the second network.

Certain aspects of the present disclosure provide an apparatus for wireless communications by a user equipment (UE). The apparatus generally includes at least one processor and a memory coupled to the at least one processor. The at least one processor is generally configured to determine, while the UE is in a coverage area of a first network, that a connection to a second network, comprising a packet data network (PDN), is disconnected locally, and take at least one action to avoid a rejection of a request to connect to the second network.

Certain aspects of the present disclosure provide a computer program product for wireless communications by a user equipment (UE). The computer program product generally includes a computer-readable medium comprising code for determining, while the UE is in a coverage area of a first network, that a connection to a second network, comprising a packet data network (PDN), is disconnected locally, and taking at least one action to avoid a rejection of a request to connect to the second network.

DETAILED DESCRIPTION

Figure 1:
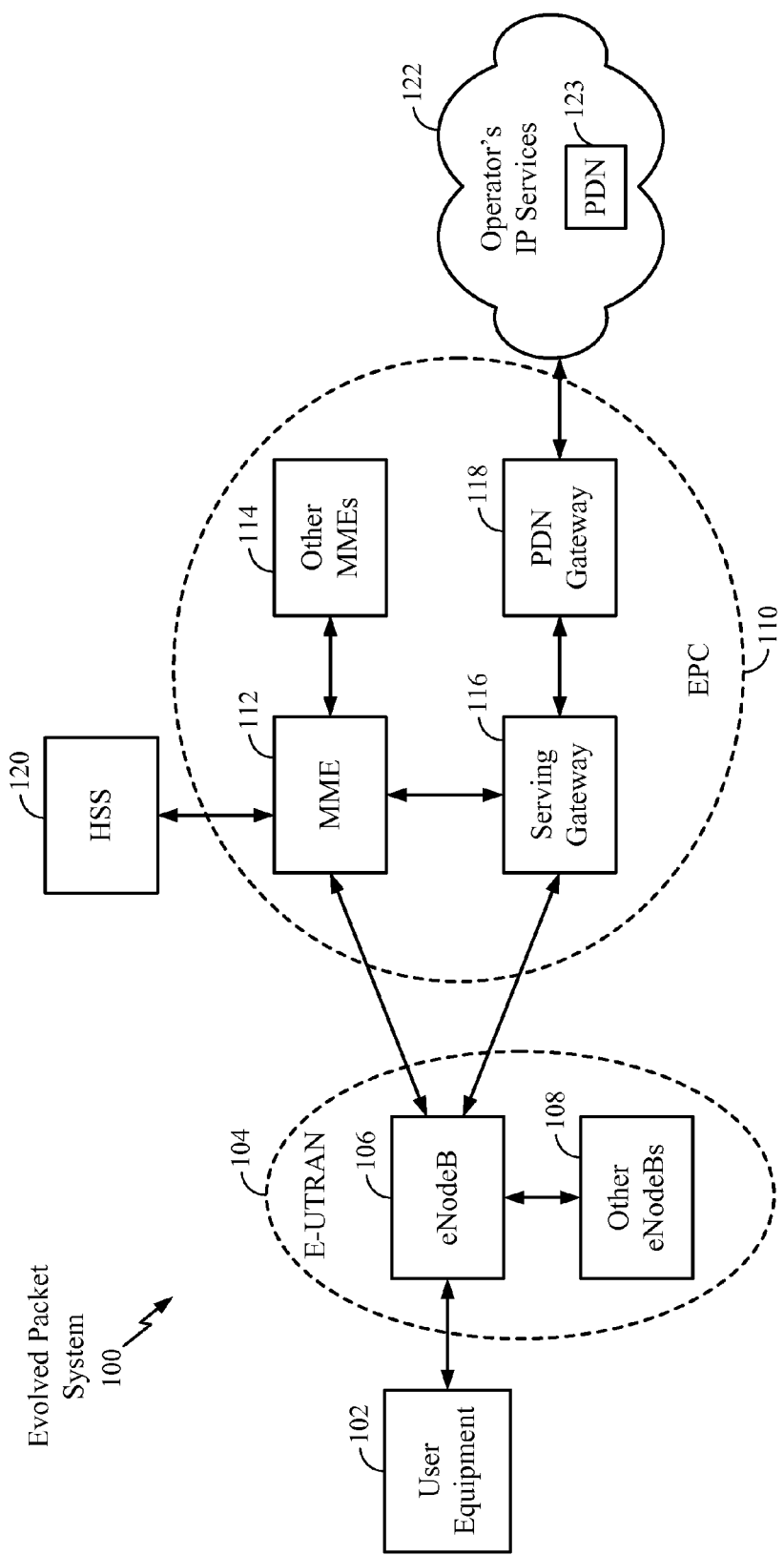
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. Exemplary other access networks may include an IP Multimedia Subsystem (IMS) PDN, Internet PDN, Administrative PDN (e.g., Provisioning PDN), carrier-specific PDN, operator-specific PDN, and/or GPS PDN. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include, for example, the Internet, the Intranet, an IP Multimedia Subsystem (IMS), and a PS Streaming Service (PSS). In this manner, the UE 102 may be coupled to the PDN through the LTE network.

The PDN gateway 118 typically provides the UE access to PDNs that are typically included in the operator's IP services 122, such as the Internet, an Intranet, and the like. In certain aspects, the LTE network 100 sets up one or more logical connections, referred to as bearers, for communication between the UE 102 and various other components of the network. For example, the LTE network may set up one or more radio bearers (RBs) for communication between the UE 102 and the E-UTRAN 104. For enabling the UE 102 to communicate beyond the E-UTRAN 104, e.g. to PDNs, the LTE network may set up one or more Enhanced Packet Services (EPS) bearers. In an aspect, there exists a one-to-one mapping between the radio bearers and the EPS bearers.

The MME 112 is a control plane entity responsible for creating the bearers for enabling the UE 102 to communicate with PDNs. The MME 112 generally does not take part in a communication of data between the UE 102 and the EUTRAN/PDN. It merely helps setup a connection between the UE 102 and a PDN (e.g. Internet). This may include the MME 112 setting up radio bearers and/or EPS bearers for communication between the UE 102 and a PDN 123. In an aspect, if a UE 102 wants to communicate with a PDN 123, but does not find the necessary bearers already set up, it may request the MME 112 to create the required bearers for communicating with the PDN 123.

In certain aspects, when the UE 102 is in LTE coverage and attached to the LTE network, it is always connected to at least one PDN gateway/PDN. If the UE 102 wishes to connect to one or more additional PDNs (e.g. connecting to an intranet while being connected to default network e.g. Internet), it may use a PDN connectivity request procedure executed between the UE 102 and MME 112 for connecting to each new PDN (e.g., since bearers are not already set up by the LTE network). The UE 102 may start sending data to the PDN gateway/new PDN once the bearers are setup by the MME 112. In certain aspects, a connection to additional PDNs may be required by an operator.

Figure 7:
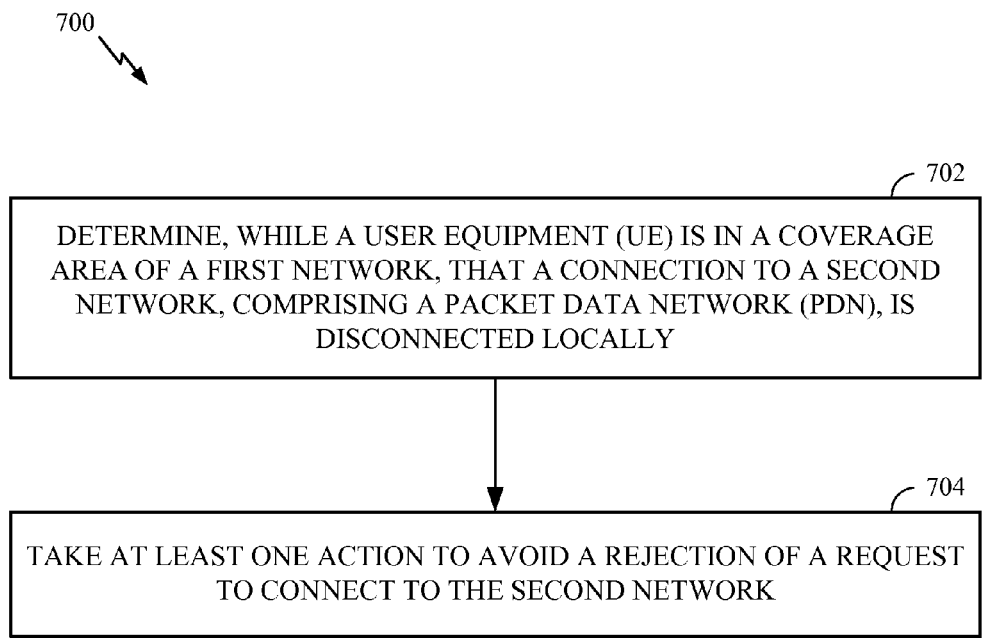
FIG. 7 illustrates example operations performed by a user equipment (UE) for avoiding a rejection of a request to connect to a packet data network (PDN), in accordance with certain aspects of the present disclosure.

LTE network and network will be used interchangeably hereafter (e.g., until the description of FIG. 7).

Figure 2:
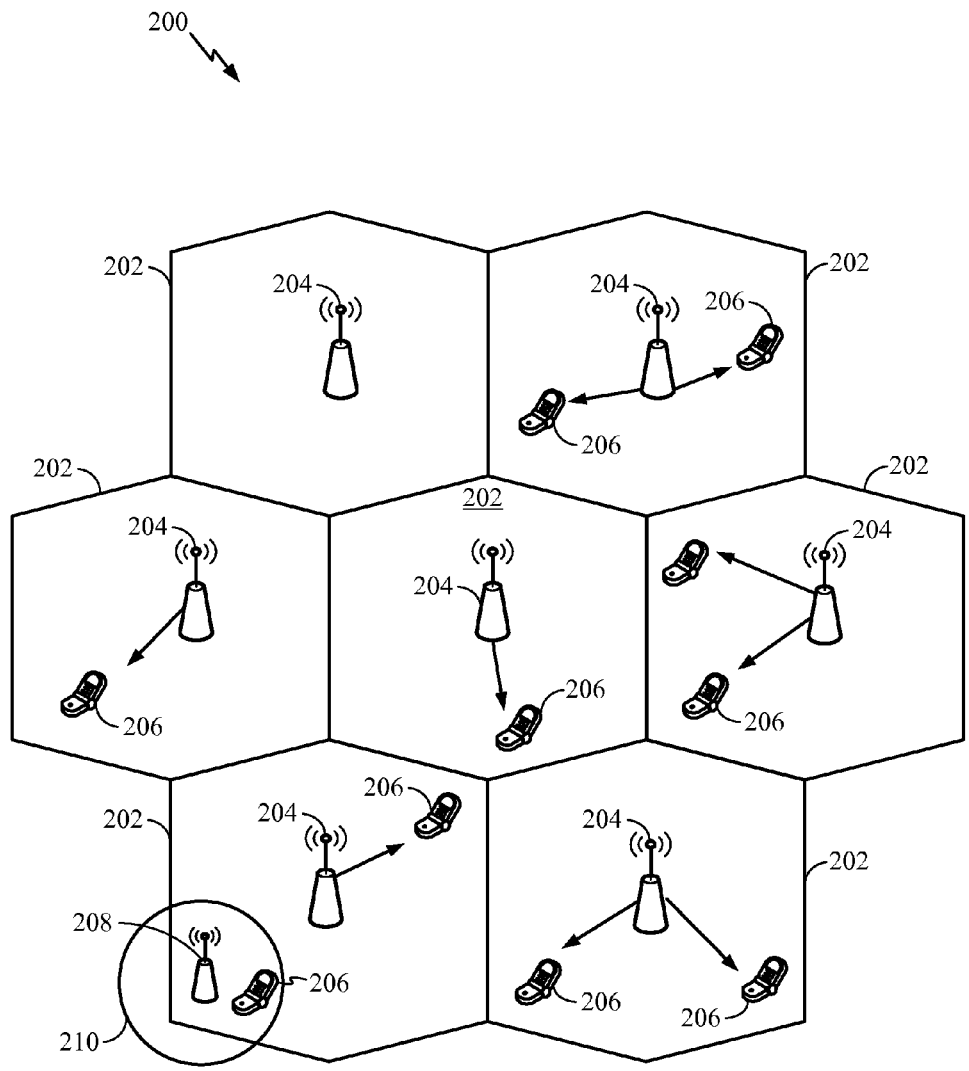
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
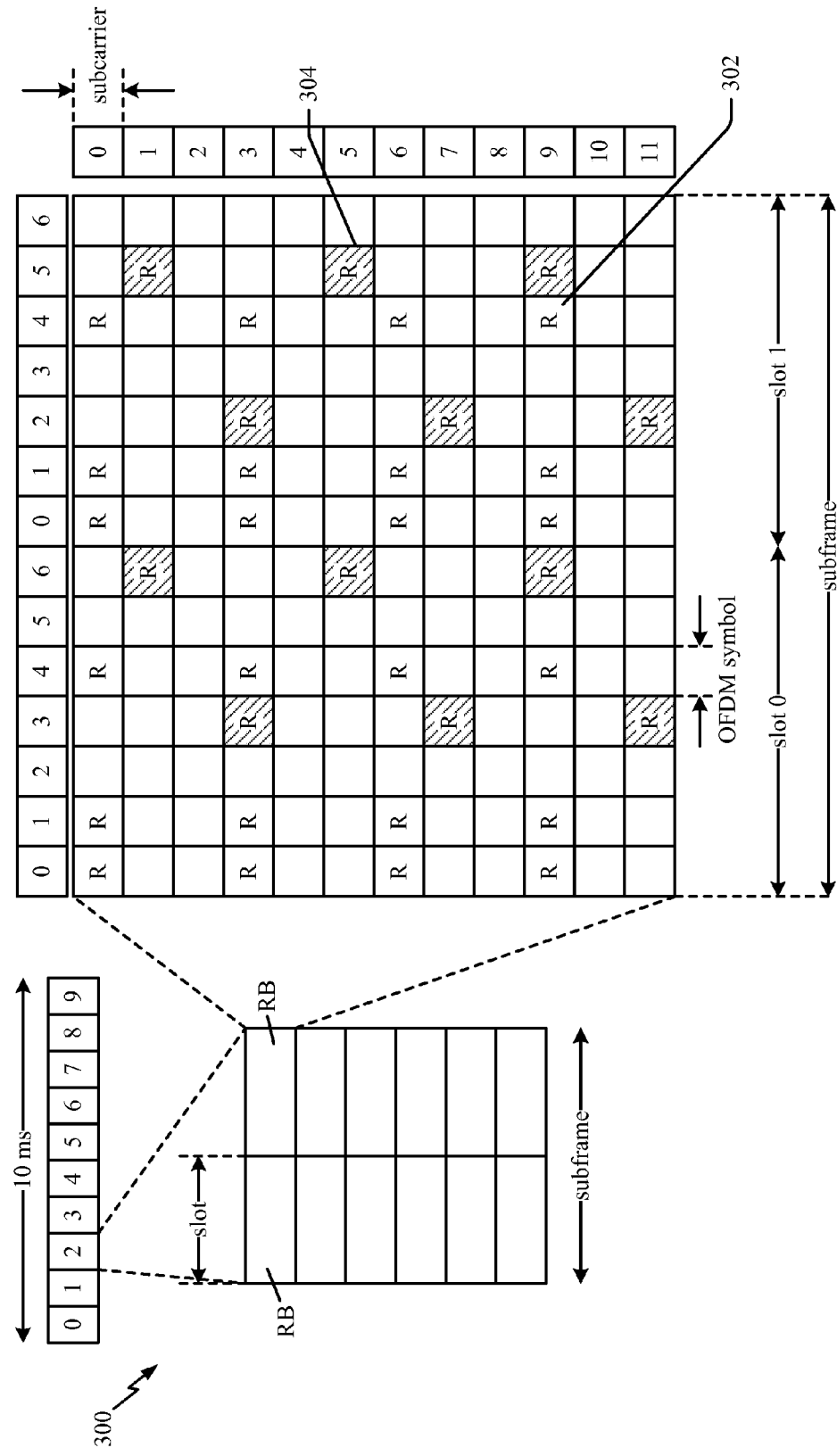
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
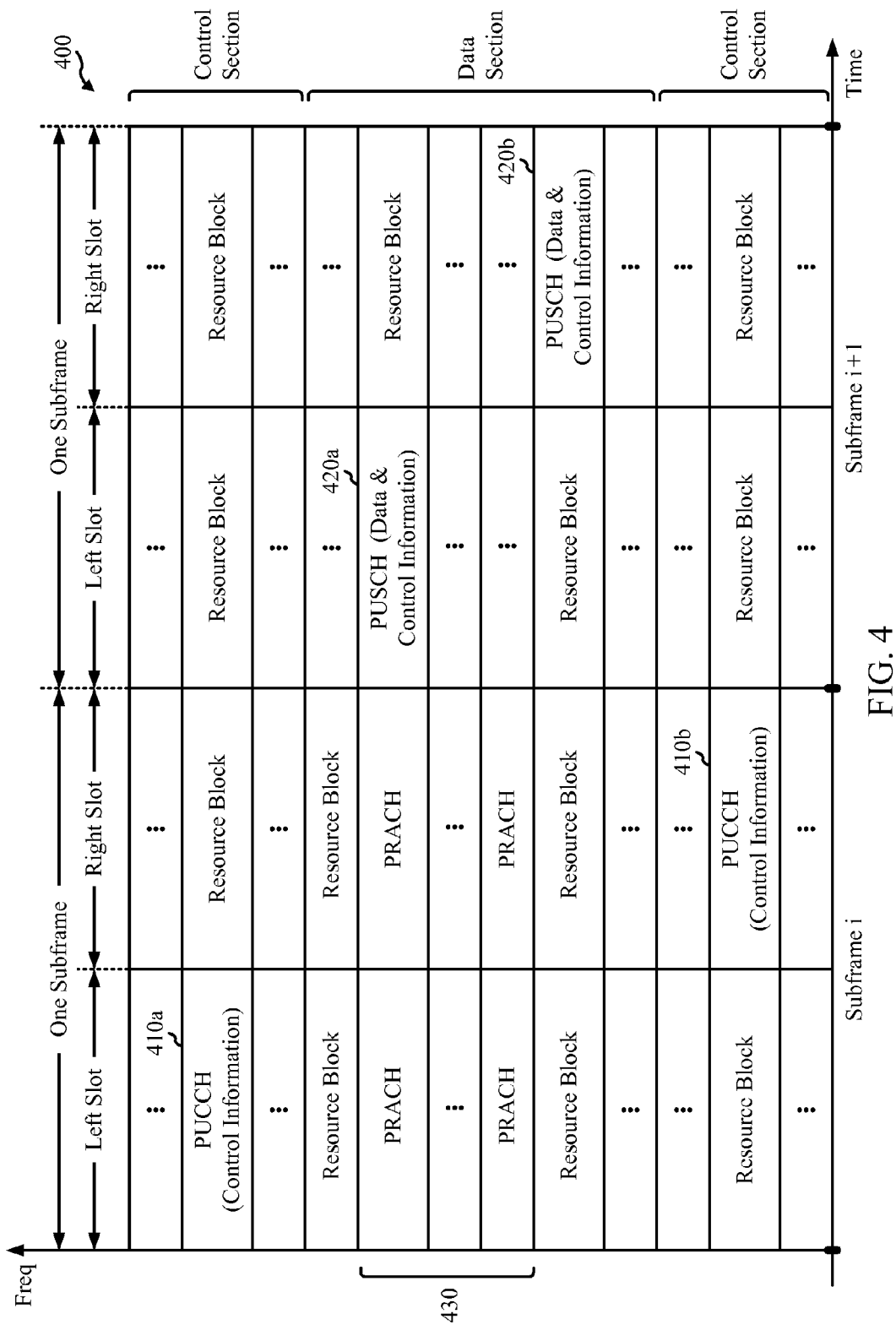
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
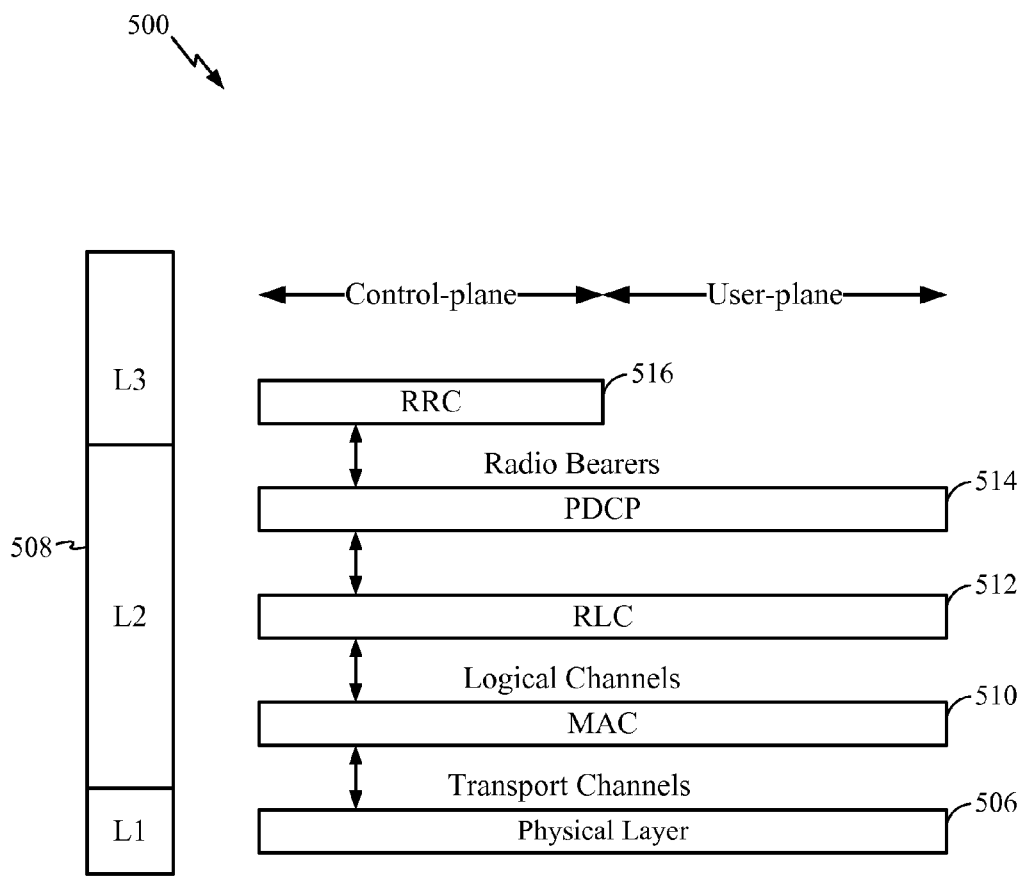
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
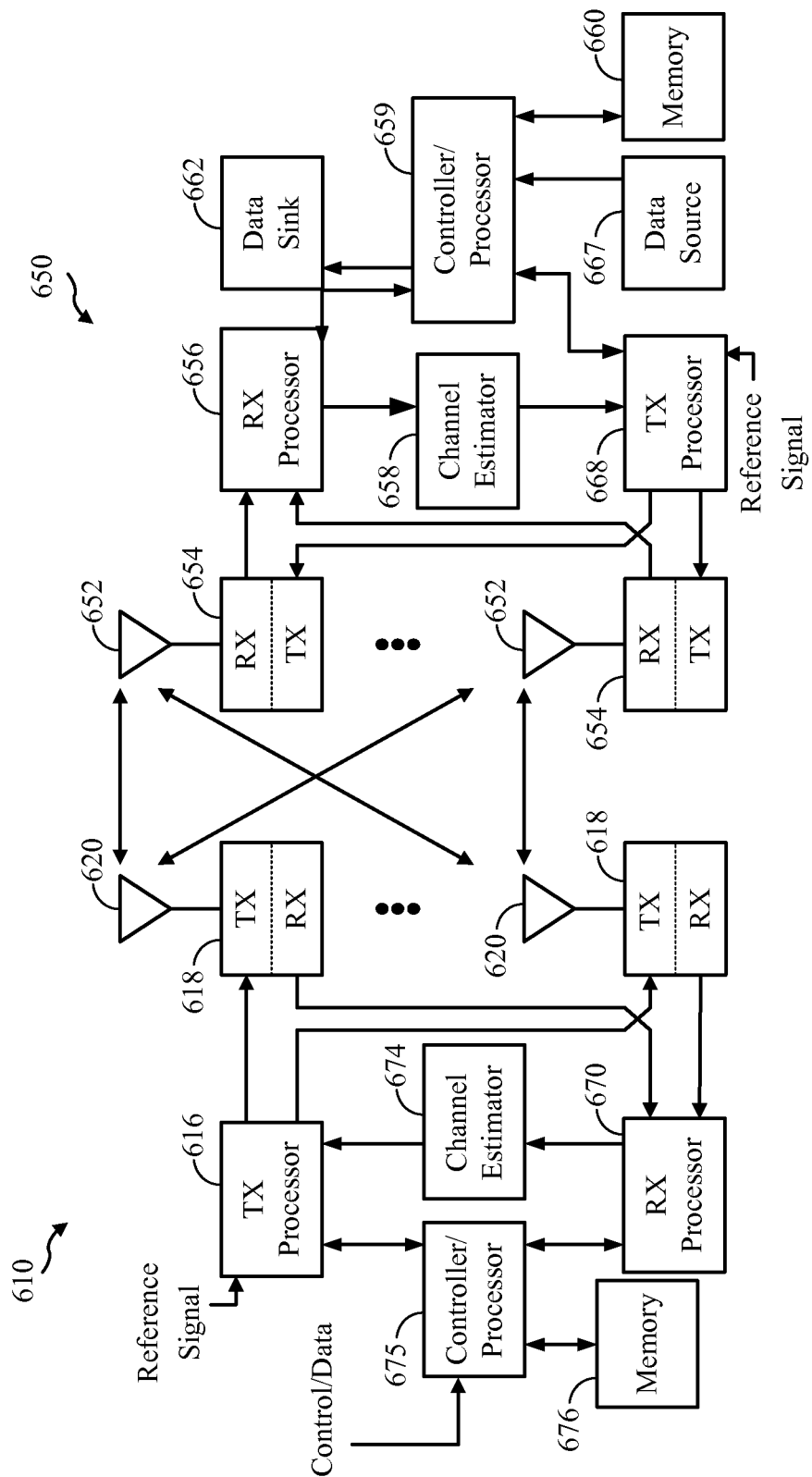
FIG. 6 is a diagram illustrating an example of an evolved Node B and user equipment in an access network, in accordance with certain aspects of the disclosure.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Example Method and Apparatus for Improving Data Service Availability

In certain aspects, the standards define LTE network/UE behaviors in various scenarios. For example, if the UE is in LTE coverage, and a PDN has to be disconnected, either by the LTE network or by the UE, explicit over the air (OTA) signaling must be used. For example, the explicit OTA signaling may include the UE sending a PDN disconnect request to the network when it wishes to disconnect the PDN. In response to receiving the PDN disconnect request, the network may clear the resources with respect to the PDN connection, for example, by de-allocating bearers used for the connection, de-allocating IP address allocated to the UE for the connection to the PDN, releasing resources allocated for the connection, clearing context on the network side and instructing the UE to clear contexts.

Further, according to the standard, if the UE requires to tear down a connection to a PDN while out of LTE coverage, the UE must terminate the connection locally. In addition, the UE is required to perform a Tracking Area Update (TAU)

as soon as it returns to the LTE network to synchronize the bearer status of the UE with the network. Similarly, if the network disconnects a PDN when the UE is out of LTE coverage, whenever the UE makes a service request, it may notice one data radio bearer (DRB) missing and is required to perform a local cleanup of context and resources assigned for communicating with the PDN. Thus, the standards assume that the network and the UE are always in sync using the standards based procedures.

However, there may be situations, not anticipated by the standards, which may lead to the UE being out of sync with the network. For example, in certain scenarios (e.g. congestion which may result in packet loss), the UE may be instructed to stop sending messages on a PDN for a predetermined time period, while in LTE network coverage. This is typically referred to as data throttling or backoff. However, if the UE disconnects the PDN locally (e.g. via closure of a browser on the UE) during data throttling while in LTE network coverage, and requests to reconnect to the PDN after the expiry of the predetermined time period (or data throttling), the network may reject the UEs request as it still thinks that the UE is connected to PDN. This is because the network does not expect such a situation to arise at all, because of the above sync mechanisms defined by the standards. However, since there may not be any TAU triggers defined for this scenario, the UE may not perform the TAU procedure while reconnecting to the PDN, and thus, leading to the LTE network and the UE going out of sync (e.g., the UE's perceived status of an EPS bearer does not match the network's perceived status of the EPS bearer). In an aspect, the rejection of the reconnection request from the UE may continue until the network treats the UE to be disconnected from the PDN, for example, as a result of inactivity. This situation may lead to the UE being unable to access services offered by the PDN until it is back in sync with the network.

Certain aspects of the present disclosure discuss one or more actions the UE may take to avoid rejection of a request to connect or re-connect to a PDN.

In a first aspect, if a PDN is disconnected locally by the UE during data throttling, the UE may initiate and/or perform a TAU procedure to synchronize bearer status of the UE with the LTE network, substantially immediately after determining that the connection to the PDN was disconnected locally at the UE during the data throttling.

In a second aspect, if a PDN is disconnected locally by the UE during data throttling, the UE may remember that the PDN was disconnected locally by means of setting a flag, and then perform a TAU procedure at the expiry of a throttling timer, if the flag is set.

In a third aspect, upon a service request, the UE may check to see if there are extra or unused (e.g., unexpected) DRBs or active bearer contexts set up by the LTE network for the UE. If yes, the UE may perform a TAU procedure to synchronize its bearer status with the network.

In a fourth aspect, if an application (e.g., an Internet browser) at the UE attempts to disconnect from a PDN while in a throttled state, the request may be buffered at the UE, and the buffered request may be executed upon expiration of the data throttling.

In a fifth aspect, the UE may set a flag on locally disconnecting a connection to a PDN. If the LTE network rejects a request by the UE to connect to a PDN, for example, by responding with a PDN connectivity reject (e.g., via cause code #55), and if the flag is set, the UE may perform a TAU for synchronizing the bearer status. In an aspect, this may reduce a number of times the TAU procedure is initiated (e.g., to only the absolutely necessary cases).

In a sixth aspect, upon a service request, the UE may check to see if there are extra or unused (e.g., unexpected) DRBs or active bearer contexts setup by the network. If yes, the UE may set a flag to indicate the possibility that the network might still have PDN context for a PDN that the UE has already disconnected locally. Subsequently, upon receiving a PDN connectivity reject (with for example cause code #55) from the network, the UE may check the flag. If the flag is set, the UE may perform the TAU to synchronize the bearer status with the network.

In a seventh aspect, if the UE performs a PDN connectivity request and receives a PDN connectivity reject (with for example cause code #55) from the network, the UE may check to see if it already is connected to the PDN that the request was made for. If not, the UE may perform the TAU to synchronize the bearer status with the network. In this manner, one or more of the aspects described above may leverage the TAU procedure to synchronize the network's and the UE's perception of the EPS bearer status.

FIG. 7 illustrates example operations 700 performed by a user equipment (UE) for avoiding a rejection of a request to connect to a packet data network (PDN) in accordance with certain aspects of the present disclosure.

Operations 700 may begin, at 702, by determining, while the UE is in a coverage area of a first network, that a connection to a second network, comprising a packet data network (PDN), is disconnected locally. At 704, the UE may take at least one action to avoid a rejection of a request to connect to the second network. In an aspect, the first network may include an LTE network and the second network may be connected via the LTE network.

In an aspect, the UE may determine that the connection to the second network was disconnected during data throttling. In an aspect, the at least one action may include initiating a TAU procedure to synchronize bearer status of the UE with the first network, substantially immediately after determining that the connection to the second network was disconnected during the data throttling.

In an aspect, the at least one action may include setting a flag on locally disconnecting the connection to the second network by the UE, and initiating a TAU procedure on expiration of a throttling timer to synchronize bearer status of the UE with the first network, if the flag is set.

In an aspect the at least one action may include determining that the first network has unexpected active radio bearer contexts, and, in response, initiating a TAU to synchronize bearer status of the UE with the first network.

In an aspect, the at least one action may include buffering a request from an application to the first network to disconnect from the second network while data throttling is in effect, buffering the request until expiration of the data throttling, and forwarding the buffered request to the first network on expiration of the data throttling.

In certain aspects, the UE may detect that a subsequent request for connection to the second network was rejected by the first network. In an aspect, the rejection of the subsequent request indicates that the first network does not allow additional connections to the second network. In an aspect, the at least one action may include determining that the first network has unexpected active radio bearer contexts, setting a flag in response to determining that the first network has unexpected active radio bearer contexts, and if the flag is set, initiating a TAU to synchronize bearer status of the UE with the first network in response to detecting the rejection of the subsequent request. In another aspect, the at least one action may include determining if the UE is connected to the second network, and initiating a TAU in response to detecting the rejection of the subsequent request and determining that the UE is not connected to the second network.

Figure 7A:
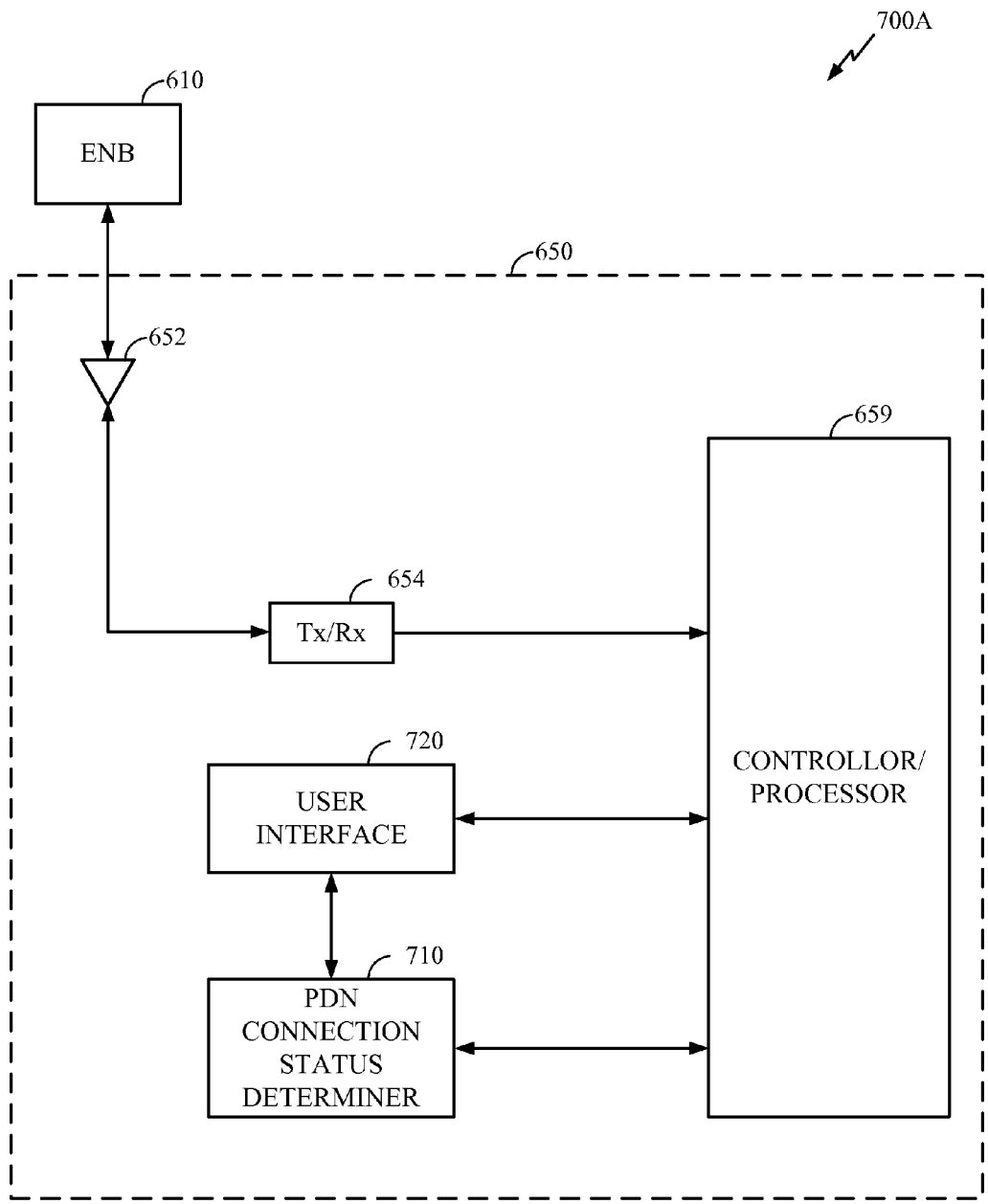
FIG. 7A illustrates example components capable of performing the operations illustrated in FIG. 7, in accordance with certain aspects of the present disclosure.

The operations 700 described above may be performed by any suitable components or other means capable of performing the corresponding functions of FIG. 7. For example, operations 700 illustrated in FIG. 7 correspond to components 700A illustrated in FIG. 7A. In FIG. 7A the PDN connection status determiner 710 may determine if and when a connection to a PDN is disconnected locally at the UE 650. For example, the determiner 710 may sense a disconnection request for a local disconnection of a PDN from the user interface 720 (e.g., via closure of a browser window) and set a flag to indicate that the PDN was disconnected locally at the UE 650. Further, the determiner 710 may also store an indication whether the local disconnection was during a data throttled state or not. The controller/processor 659 may take one or more actions to avoid a rejection of a subsequent request by the UE 650 to connect to the PDN. In an aspect, the controller 659 may initiate a TAU procedure to synchronize bearer status of the UE 650 with the eNB 610, on determining that the connection to the PDN was disconnected locally (e.g., if the flag is set).

In certain aspects, on a subsequent request for connection to the PDN, the determiner 710 may notice that the eNB 610 has unexpected active radio bearer contexts for the PDN. In response, the controller 659 may initiate a TAU procedure to synchronize bearer statuses with the eNB 610.

In certain aspects, the controller 659 may buffer a request from an application (e.g., received via the user interface 720) to disconnect from a PDN, while in a data throttled state. The controller 659 may forward the buffered request to the eNB on expiration of the data throttling.

Figure 8:
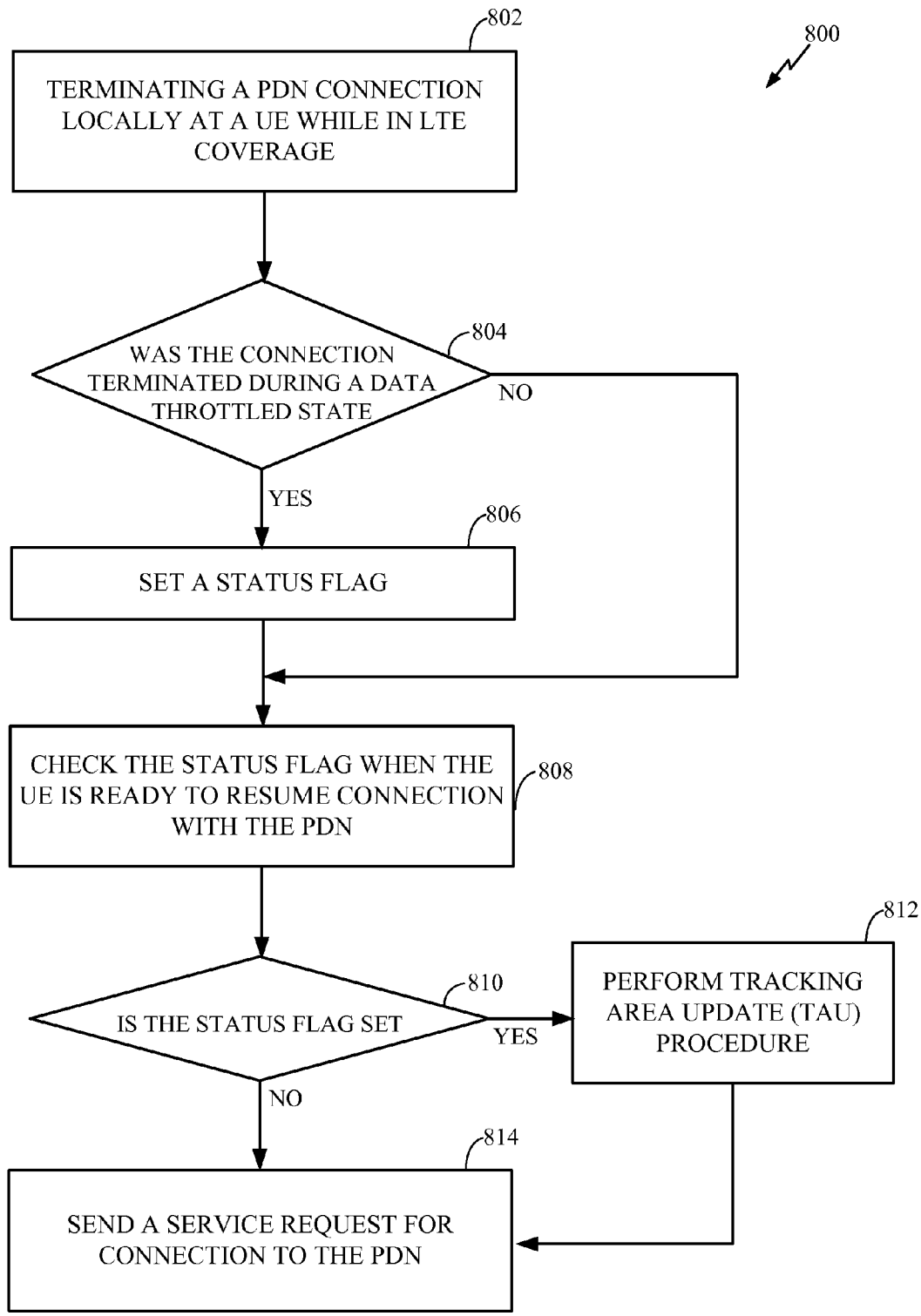
FIG. 8 illustrates example operations performed by a user equipment (UE) for avoiding a rejection of a request to connect to a packet data network (PDN) in accordance with certain aspects of the present disclosure.

FIG. 8 illustrates example operations 800 performed by a user equipment (UE) for avoiding a rejection of a request to connect to a packet data network (PDN) in accordance with certain aspects of the present disclosure.

Operations 800 may begin, at 802, by terminating a PDN connection locally at the UE while in LTE coverage. As discussed above, the termination of the PDN may take place, for example, due to closure of a browser window on a user interface. At 804, the UE may check if the connection was terminated locally during a data throttled state. If yes, the UE may set a status flag at 806. However, if the PDN connection was not terminated during a data throttled state, operations 800 may directly proceed to process block 808. At 808, the UE may check the status flag when it is ready to resume connection with the PDN. In an aspect, the UE may decide to resume the PDN connection after expiry of the data throttling. At 810, if the status flag is set indicating that the UE terminated the PDN connection during a data throttled state, the UE may perform a tracking area update procedure to synchronize its bearer status with that of the network. Subsequently, the UE may send a service request to the network to request a connection to the PDN. At 810, if the flag is not set, bearer statuses of the UE and the network may already be in sync following the standard procedures and the UE may directly proceed to sending the service request to the network. For example, as discussed above, if the UE terminated the PDN connection during a non-data throttled state, the UE must have synchronized its bearer status with the network via over the air (OTA) signaling, in accordance with standard prescribed procedures.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

As used herein, a phrase referring to "at least one of" a list of items refers to any combination of those items, including single members. As an example, "at least one of: a, b, or c" is intended to cover: a, b, c, a-b, a-c, b-c, and a-b-c.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for wireless communications by a user equipment (UE), comprising:
   locally disconnecting, during data throttling in a coverage area of a first network, a connection to a second network comprising a packet data network (PDN), wherein the locally disconnecting comprises receiving a request from an application at the UE to disconnect the connection to the second network while the data throttling is in effect;
   setting a flag on locally disconnecting the connection to the second network by the UE; and
   taking at least one action to avoid a rejection of a request to connect to the second network after expiry of the data throttling, wherein taking the at least one action comprises initiating a tracking area update (TAU) on expiration of a throttling timer indicating the expiry of the data throttling, to synchronize bearer status of the UE with the first network, if the flag is set.

2. A method for wireless communications by a user equipment (UE), comprising:
   locally disconnecting, during data throttling in a coverage area of a first network, a connection to a second network comprising a packet data network (PDN), wherein the locally disconnecting comprises receiving a request from an application at the UE to disconnect the connection to the second network while the data throttling is in effect; and
   taking at least one action to avoid a rejection of a request to connect to the second network after expiry of the data throttling,
   wherein taking the at least one action comprises:

determining that the first network has unexpected active radio bearer contexts; and in response, initiating a tracking area update (TAU) to synchronize bearer status of the UE with the first network.

3. A method for wireless communications by a user equipment (UE), comprising:

locally disconnecting, during data throttling in a coverage area of a first network, a connection to a second network comprising a packet data network (PDN), wherein the locally disconnecting comprises receiving a request from an application at the UE to disconnect the connection to the second network while the data throttling is in effect;

setting a flag on locally disconnecting the connection to the second network by the UE;

detecting that a subsequent request for connection to the second network was rejected by the first network; and taking at least one action to avoid a rejection of a request to connect to the second network after expiry of the data throttling, wherein taking the at least one action comprises, if the flag is set, initiating a tracking area update (TAU) to synchronize bearer status of the UE with the first network in response to detecting the rejection of the subsequent request.

4. A method for wireless communications by a user equipment (UE), comprising:

locally disconnecting, during data throttling in a coverage area of a first network, a connection to a second network comprising a packet data network (PDN), wherein the locally disconnecting comprises receiving a request from an application at the UE to disconnect the connection to the second network while the data throttling is in effect;

detecting that a subsequent request for connection to the second network was rejected by the first network; and taking at least one action to avoid a rejection of a request to connect to the second network after expiry of the data throttling, wherein taking the at least one action comprises:
determining that the first network has unexpected active radio bearer contexts;
setting a flag in response to determining that the first network has unexpected active radio bearer contexts; and
if the flag is set, initiating a tracking area update (TAU) to synchronize bearer status of the UE with the first network in response to detecting the rejection of the subsequent request.

5. An apparatus for wireless communications, comprising:

means for locally disconnecting, during data throttling in a coverage area of a first network, a connection to a second network comprising a packet data network (PDN), wherein the means for locally disconnecting is configured to receive a request from an application at the apparatus to disconnect the connection to the second network while the data throttling is in effect, wherein the means for locally disconnecting the connection to the second network is configured to set a flag on locally disconnecting the connection to the second network by the UE; and means for taking at least one action to avoid a rejection of a request to connect to the second network after expiry of the data throttling, wherein the means for taking the at least one action is configured to initiate a tracking area update (TAU) on expiration of a throttling timer indicating the expiry of the data throttling, to synchronize bearer status of the apparatus with the first network, if the flag is set.

6. An apparatus for wireless communications, comprising:

means for locally disconnecting, during data throttling in a coverage area of a first network, a connection to a second network comprising a packet data network (PDN), wherein the means for locally disconnecting is configured to receive a request from an application at the apparatus to disconnect the connection to the second network while the data throttling is in effect; and means for taking at least one action to avoid a rejection of a request to connect to the second network after expiry of the data throttling, wherein the means for taking the at least one action is configured to:
determine that the first network has unexpected active radio bearer contexts; and
in response, initiate a tracking area update (TAU) to synchronize bearer status of the apparatus with the first network.

7. An apparatus for wireless communications, comprising:

means for locally disconnecting, during data throttling in a coverage area of a first network, a connection to a second network comprising a packet data network (PDN), wherein the means for locally disconnecting is configured to receive a request from an application at the apparatus to disconnect the connection to the second network while the data throttling is in effect, wherein the means for locally disconnecting the connection to the second network is configured to set a flag on locally disconnecting the connection to the second network by the apparatus;

means for detecting that a subsequent request for connection to the second network was rejected by the first network; and means for taking at least one action to avoid a rejection of a request to connect to the second network after expiry of the data throttling, wherein the means for taking at least one action is configured to, if the flag is set, initiate a tracking area update (TAU) to synchronize bearer status of the apparatus with the first network in response to detecting the rejection of the subsequent request.

8. An apparatus for wireless communications, comprising:

means for locally disconnecting, during data throttling in a coverage area of a first network, a connection to a second network comprising a packet data network (PDN), wherein the means for locally disconnecting is configured to receive a request from an application at the apparatus to disconnect the connection to the second network while the data throttling is in effect, wherein the means for locally disconnecting the connection to the second network is configured to set a flag on locally disconnecting the connection to the second network by the apparatus;

means for detecting that a subsequent request for connection to the second network was rejected by the first network; and means for taking at least one action to avoid a rejection of a request to connect to the second network after expiry of the data throttling, wherein the means for taking the at least one action is configured to:

determine that the first network has unexpected active radio bearer contexts;
set a flag in response to determining that the first network has unexpected active radio bearer contexts; and
if the flag is set, initiate a tracking area update (TAU) to synchronize bearer status of the apparatus with the first network in response to detecting the rejection of the subsequent request.

9. An apparatus for wireless communications, comprising:
at least one processor configured to:
locally disconnect, during data throttling in a coverage area of a first network, a connection to a second network comprising a packet data network (PDN), wherein the at least one processor is configured to receive a request from an application at the apparatus to disconnect the connection to the second network while the data throttling is in effect; and
take at least one action to avoid a rejection of a request to connect to the second network after expiry of the data throttling,
wherein taking at least one action to avoid a rejection of a request to connect to the second network comprises:
determining that the first network has unexpected active radio bearer contexts; and
in response, initiating a tracking area update (TAU) to synchronize bearer status of the apparatus with the first network; and
a memory coupled to the at least one processor.

10. A non-transitory computer-readable medium for wireless communications by a user equipment (UE), the non-transitory computer-readable medium comprising code for:
locally disconnecting, during data throttling in a coverage area of a first network, a connection to a second network comprising a packet data network (PDN), wherein the locally disconnecting comprises receiving a request from an application at the UE to disconnect the connection to the second network while the data throttling is in effect; and
taking at least one action to avoid a rejection of a request to connect to the second network after expiry of the data throttling,
wherein the code for taking the at least one action includes code for:
determining that the first network has unexpected active radio bearer contexts; and
in response, initiating a tracking area update (TAU) to synchronize bearer status of the UE with the first network.

* * * * *